(12) United States Patent
Wen

(10) Patent No.: US 6,950,171 B2
(45) Date of Patent: Sep. 27, 2005

(54) LIQUID CRYSTAL COLOR SWITCH AND METHOD OF MANUFACTURE

(75) Inventor: Jing Wu Wen, Beijing (CN)

(73) Assignee: Inshon INC, Plano, TX (US)

( * ) Notice: Subject to any disclaimer, the term of this patent is extended or adjusted under 35 U.S.C. 154(b) by 116 days.

(21) Appl. No.: 10/641,674

(22) Filed: Aug. 15, 2003

(65) Prior Publication Data

US 2004/0031672 A1 Feb. 19, 2004

(30) Foreign Application Priority Data

Aug. 15, 2002 (CN) .......................................... 02128839

(51) Int. Cl.$^7$ ................................................ G02F 1/13
(52) U.S. Cl. ......................... 349/169; 349/35; 349/196; 349/197
(58) Field of Search .......................... 349/35, 169, 196, 349/197

(56) References Cited

U.S. PATENT DOCUMENTS 4,264,149 A * 4/1981 de Zwart et al. ............. 349/34
6,061,107 A * 5/2000 Yang et al. ................... 349/86

* cited by examiner

Primary Examiner—James A. Dudek
(74) Attorney, Agent, or Firm—William A. Fietz

(57) ABSTRACT

This invention involves one kind of liquid crystal color light switch, made especially from cholesteric liquid crystals. By changing the voltage applied, the reflection wavelength of the color light switch can be controlled, leading to a rapid change of the reflected light from red to green to blue in rapid succession, thus creating a color display. The core technology of this invention is making the voltage applied to the cholesteric liquid crystal less than the untwisted voltage and still in good focal conic state, that is the symmetric axis are in the same direction, and the pitch is varied according to the voltage applied.

4 Claims, 2 Drawing Sheets

LIQUID CRYSTAL COLOR SWITCH AND METHOD OF MANUFACTURE

CROSS-REFERENCE TO RELATED APPLICATIONS

This application is for the same invention and is claiming the filing date of Chinese application #02128839.9 filed on Aug. 15, 2002.

STATEMENT REGARDING FEDERALLY SPONSORED RESEARCH OR DEVELOPMENT

Not Applicable

BACKGROUND OF THE INVENTION

People continue to demand better and better quality for low-power color liquid crystal displays. In some special applications, for example for large-screen LCOS (Liquid Crystal On Silicon) projection displays, the requirements include photo-realistic images, fast and accurate colors, and high light efficiency. So far, no color light switch exists that can accept strong light illumination and absorb close to zero light in the process.

Currently, two major technologies dominate the use of liquid crystal displays for displaying color. The most common is STN-LCD and TFT-LCD, which use color filters to determine its basic colors that cannot be changed by external means. Another is Electrically Controlled Birefringence (ECB) liquid crystal display technology, where the basic colors are obtained by controlling the voltages applied to the liquid crystal layer to change the retardation. The light mostly concentrates in the center, thus it is not as clear around the edges, and light efficiency is low. Neither of these technologies can change colors quickly. Also, both technologies use polarizers and color filters that absorb light. When strong light is shone on the imagers used for projection displays, the temperature will rise to a point where it exceeds the normal operating range of the imager. Thus, color displays based on current liquid crystal technologies cannot fulfill the needs of color projection.

BRIEF SUMMARY OF THE INVENTION

This invention concerns a color light switch and the method of its manufacture. Through the control of an applied voltage, the color light switch can change its critical reflection wavelength, so that the incident white light from an oblique angle will reflect red and then green and then blue in rapid succession in response to the applied voltage, thus realizing a color display system.

It is an object of the invention to provide a liquid crystal color light switch, with a cell of liquid-crystals, comprising upper and lower transparent substrates, sealed on all sides, with corresponding inside surfaces of the transparent substrates coated with transparent electrodes. The inside surface of the transparent electrodes are further coated with alignment layers, with the pre-tilt angle ranging from about 1° to about 89°. A layer of cholesteric liquid crystals in a focal conic state is between the two transparent electrodes, with symmetrical axis of all domains in the same direction, parallel to the two transparent electrodes. The controlled voltage is applied to change the critical reflection wavelength.

It is a further object of the invention to provide a method of manufacturing a liquid crystal color light switch with liquid crystal in a cholesteric phase, being a mixture of nematic liquid crystal and chiral components, in weight proportion of about 0.67:1 to about 10:1.

On the upper and lower substrates are evaporated transparent electrodes, further coated with organic material or evaporated with inorganic material as alignment layers. The prepared liquid crystal cell is placed inside an oven, heated above the clean point of the liquid crystal mixture, and then cooled slowly, until a good one-dimensional focal conic state is reached, the temperature of clean point is 70° C. to 100° C.

Normal liquid crystal cell is filled with cholesteric liquid crystals containing both planar and focal conic states. In the planar state, the symmetric axis is perpendicular or near perpendicular to the substrate. When light is incident, only that with same rotation direction as cholesteric liquid crystal structure will produce Bragg reflection, while the rest is transmitted out of the liquid crystal layer.

In the quiescent state, with no applied voltage, the wavelength $\lambda$ of the reflected light and bandwidth $\Delta\lambda$ are respectively:

$$\lambda = \underline{n} P \cos \theta \quad (1)$$

$$\Delta\lambda = \Delta n/n\lambda \cos\theta \text{ or } \Delta\lambda = \Delta n\, P \cos\theta \quad (2)$$

$$\underline{n} = (n_e + n_0)/2 \quad (3)$$

$\underline{n}$ is the average refractive index of cholesteric liquid crystal. P is twist pitch. $\Theta$ is the angle between the incident light and symmetry axis. $\Delta n = n_e - n_0$. $n_e$ is extra ordinary refractive index of liquid crystal. $n_0$ is ordinary refractive index.

In the normal focal conic state, the symmetric axis is parallel or near parallel to the substrate, and the domains are two-dimensional randomly distributed. When the incident light is shone, a small amount is scattered back, while the rest is transmitted through the device.

In the quiescent state, there are two different structures/states and a lot of gray scale middle states, all of which are stable. There are numerous small domains with their symmetry axis facing different directions. At a certain electric field, the two different states can change back and forth in the same phase.

This invention utilizes special surface treatments and drive technology to obtain within the total or partial liquid crystal layer a stable one-dimension aligned focal conic state. The incident light and reflected light are on opposite sides of the liquid crystal cell.

According to formula (1), the critical reflection wavelength is determined by the pitch P, the incident angle theta, and the average refractive index of the liquid crystal material.

The pitch P of the cholesteric liquid crystal can be modified by changing the applied voltage. In other words, P is a function of V. When the applied electromagnetic field is strong enough, the pitch P becomes infinitely long.

This liquid crystal color light switch operates when P is within limited values so that the liquid crystal maintains its focal conic state and no planar state appears. At a different electromagnetic field, the corresponding pitch P(V) corresponds to different reflection wavelength. When the reflection wavelength is inside visible light spectrum, it will correspond to different colors. As a result, the center of the reflection wavelength is continuously adjustable.

This invention possesses the following advantages over existing technologies:
1. This invention uses the electro-optic characteristics of cholesteric liquid crystals, using the applied voltage on the liquid crystal layer to change the wavelength of the reflected light, so that the voltage can rapidly change the colors being reflected.
2. This invention is not constructed with layers that absorb light (e.g., polarizers, color filters), which would raise the operating temperature of the device under strong light illumination, and which would reduce the light efficiency of the device. This device allows use of strong light illumination, and is suitable for use with LCOS, DMD and other imagers and other telecommunications devices.
3. This invention produces very little scattering of light. The transmitted and reflected lights travel without scattering effects.

DETAILED DESCRIPTION OF THE INVENTION

Figure 1:
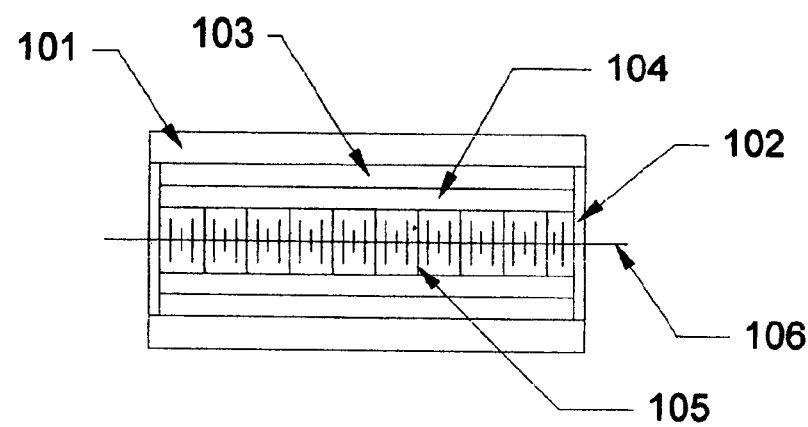
FIG. 1 depicts a diagram of the invention (color light switch).

FIG. 1 illustrates an example of a liquid crystal color light switch. In this example, we have a liquid-crystal cell, consisted of upper and lower transparent substrates (101), made of glass or other materials, sealed on all sides (102), with corresponding inner surfaces of the transparent substrates coated with transparent electrodes (103), transparent conductive coatings are typically made with ITO (Indium-Tin Oxide, which is Indium oxide doped with tin oxide), the inside surface of the transparent electrodes coated with alignment layers (104), with the pre-tilt angle ranging from 1° to 89°, a higher pre-tilt angle (>30°) produces more stable focal conic state, the alignment layer helps align the liquid crystals with a correct alignment and pre-tilt angle. In this example the pre-tilt angle is around 60°.

There is a layer of cholesteric liquid crystals (105) between the two transparent substrates, the liquid crystals are in one dimension aligned focal conic state, the symmetrical axis (106) of all domains are in the same direction, and parallel to the two transparent substrates. The applied voltage is controlled to change the critical reflection wavelength. The cholesteric liquid crystal material used is a mixture of nematic liquid crystal and chiral component, their proportion by weight being 2:3 to 10:1. The best ratio is around 1:1 to 4:1. Other inactive ingredients, such as coagulants and surfactants, can also be added, not exceeding 5% by weight of the mixture.

The key to a successful liquid crystal color light switch is the construction of the liquid crystal cell and the selection of the liquid crystal mixture. The thickness of the liquid crystal should be small. In our example, the thickness is 1 to 10 micrometer. The liquid crystal cell measures 0.8" by 0.8", without use of spacer.

$$P = 1/\Sigma A_i C_i$$

$A_i$ Is the twist power of No.i twist component; $C_i$ is the concentration of the component.

Figure 2:
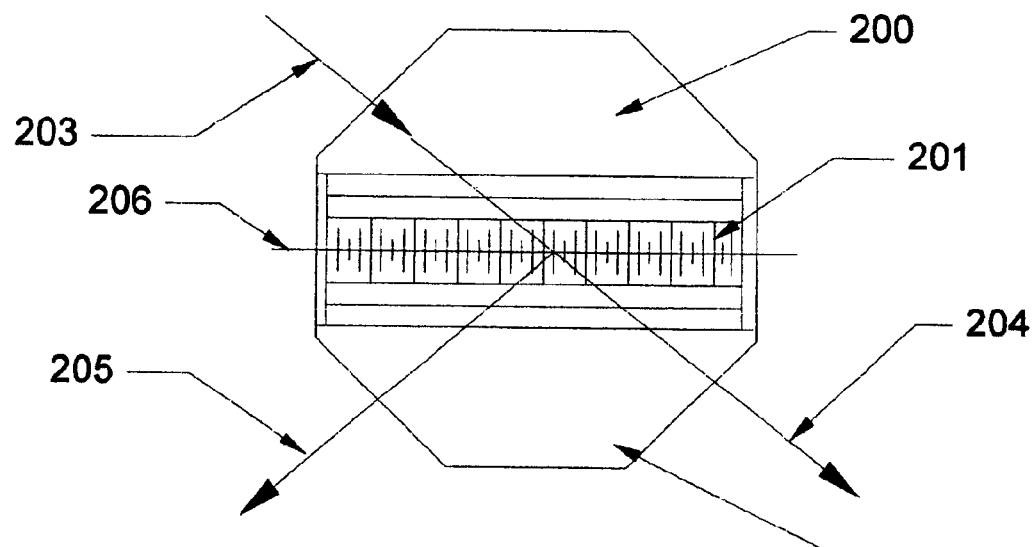
FIG. 2 depicts the interaction of light with the color light switch.

In FIG. 2, this invention is integrated with two supporting trapezoidal prisms (200, 202). To simplify manufacturing to suit mass production, it is best to use material with compatible refractive indices, like Canadian Balsam or cured resin, to glue the transparent prisms to the liquid crystal cell substrates. Inside the liquid crystal cell is the one dimension aligned cholesteric liquid crystal material (201) in focal conic state, its symmetric axis (206) being parallel to one another and to the substrates. Incident light (203) and reflected light (205) are on opposite sides of the liquid crystal cell, and in the same plane with the symmetric axis. If we view the incident white light as consisted of left and right circularly polarized, only the light with the same polarity as the cholesteric liquid crystal at a certain wavelength will be reflected, the rest will be transmitted, forming the transmitted light (204). The transmitted light is the complement of the reflected light, which is the incident light minus the reflected light.

The center wavelength of the reflected light is:

$$\lambda = \underline{n} \, P \cos \theta$$

Figure 3:
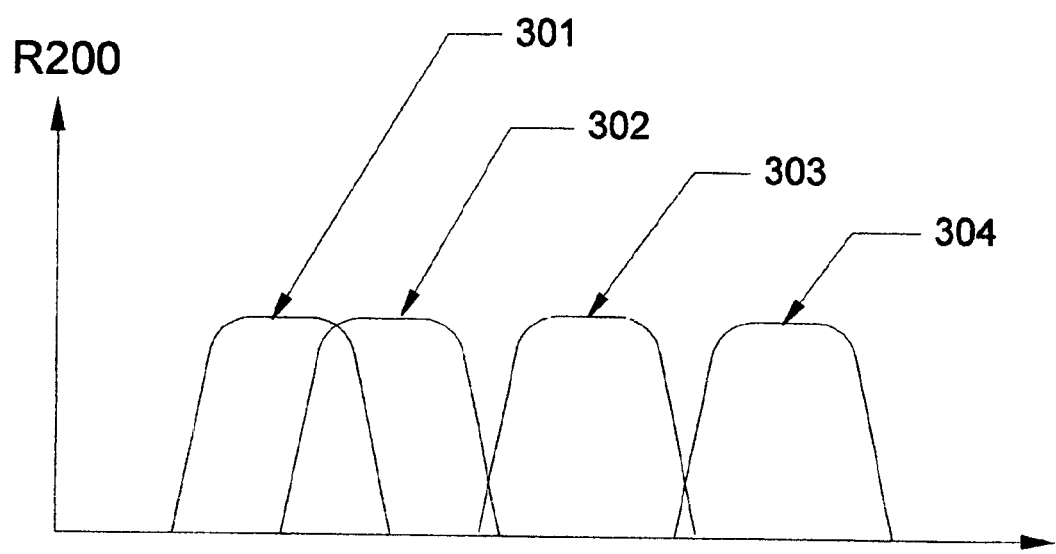
FIG. 3 depicts the color spectrum of the reflective light under the various control voltages applied.

In FIG. 3, when a voltage of $V_0=0$ is applied to the liquid crystal cell, curve 301 shows the reflected light spectrum is centered at wavelength of 400 nm. When a voltage of $V_1$ is applied to the liquid crystal cell, curve 302 shows the reflected light spectrum is centered at wavelength of 450 nm. When a voltage of $V_2$ is applied to the liquid crystal cell, curve 303 shows the reflected light spectrum is centered at wavelength of 550 nm. When a voltage of $V_3$ is applied to the liquid crystal cell, curve 304 shows the reflected light spectrum is centered at wavelength of 610 nm.

In this example, the applied voltage is a pulsed voltage that does not have direct current component when averaged over time.

EXAMPLE 1 OF THE METHOD USED IN MANUFACTURING THE COLOR LIGHT SWITCH a. Preparing the liquid crystal mixture using EM supplied chemicals. The proportion by weight of ZLI-5400-100: R1011:CB-15:R-811=76:5:12:7.
b. Depositing on the upper and lower substrates thin film layers of ITO by evaporation to form transparent electrodes, on top of which are deposited SiOx, the pre-tilt angles being around 60°.
c. The pre-tilt angles of the alignment layer on the upper and lower electrodes are parallel but in opposite direction.
d. Construct a liquid crystal cell with thickness of 2.3 micrometer, and size of 0.8" by 0.8". Through vacuum suction or capillary action, the cell is filled with the prepared liquid crystal mixture, and all sides sealed with sealant;
e. The outer surfaces of the upper and lower glass substrates are cleaned thoroughly, Canadian balsam applied, and two trapezoidal prisms glued on the cleaned surfaces, with care taken to ensure that no bubbles are trapped in the process;
f. The prepared liquid crystal cell is placed inside an oven, heated at or above the clean point of the liquid crystal mixture, and then cooled slowly, until a good single-domain focal conic state is reached, the corresponding temperature is 70° C. to 100° C. (80° being best.)

EXAMPLE 2 OF THE METHOD USED IN MANUFACTURING THE COLOR LIGHT SWITCH a. Preparing the liquid crystal mixture using EM supplied chemicals. The proportion by weight of ZLI-5400-100: R1011:CB-15:R-811=76:5:12:7.
b. Evaporating on the transparent electrodes on the upper and lower glass substrates is SiOx, with pre-tilt angle of 65°;

c. Rubbing in a single direction applied opposite to the organic alignment material on the surface;
d. Through vacuum suction or capillary action, filling the cell with the prepared liquid crystal mixture, and sealing all sides;
e. Cleaning the outer surfaces of the upper and lower glass substrates thoroughly, applying Canadian balsam, and gluing two trapezoidal prisms glued on the cleaned surfaces, with care taken to ensure that no bubbles are trapped in the process; and
f. Applying a voltage greater than the untwist voltage between the two substrates, the alternating frequency being 1 kHz, the voltage being around 25V, and lasting longer than 10 microseconds, and then the voltage dropped gradually to 10V in about 2 seconds or longer, to enable the liquid crystals to get into field induced nematic state, and then slowly reduce the voltage further, until a good one-dimensional focal conic state is obtained.

What is claimed is:

1. A liquid-crystal color light switch, comprising:

a cell of liquid-crystals with upper and lower transparent substrates sealed on all sides, wherein;

corresponding inner surfaces of said upper and lower transparent substrates are coated with transparent electrodes and alignment layers having a pre-tilt angle ranging from 0 to 90°; and a layer of cholesteric liquid crystal in a focal conic state is contained between said transparent electrodes;

said cholesteric liquid crystal having the symmetrical axes of all domains in the same direction, parallel to the two transparent electrodes; and containing provision that a controlled voltage may be applied to said transparent electrodes to change the critical reflection wavelength.

2. A liquid-crystal color light switch of claim 1, wherein the thickness of the liquid-crystal cell is 1–10 micrometers without a spacer.

3. A liquid-crystal color light switch of claim 2, further comprising: liquid crystal in a cholesteric phase, being a mixture of nematic liquid crystal and chiral components, their proportion by weight being from about 0.67:1 to 10:1.

4. A liquid-crystal color light switch of claim 2, further including: the pre-tilt angle being 5–65°.

* * * * *